United States Patent [19]
Dunchock

[11] Patent Number: 5,778,063
[45] Date of Patent: *Jul. 7, 1998

[54] DIGITAL RECORDER REVERSIBLE MOUNT FOR A TELEPHONE

[76] Inventor: Richard Dunchock, 254 Driftwood Rd., Corona Del Mar, Calif. 92625

[ * ] Notice: The term of this patent shall not extend beyond the expiration date of Pat. No. 5,583,935.

[21] Appl. No.: 702,065

[22] Filed: Aug. 23, 1996

Related U.S. Application Data

[63] Continuation-in-part of Ser. No. 516,099, Aug. 17, 1995, Pat. No. 5,583,935.

[51] Int. Cl.$^6$ ................................................. H04M 1/00
[52] U.S. Cl. ...................... 379/446; 379/454; 379/455; 379/447
[58] Field of Search ............................ 379/446, 454, 379/455, 449, 447, 420, 426, 88, 436; 455/89, 90, 128, 347; 248/205.2, 224.7, 314

[56] References Cited

U.S. PATENT DOCUMENTS

| | | | |
|---|---|---|---|
| 4,610,054 | 9/1986 | Malian | 248/205.2 |
| 4,620,067 | 10/1986 | D'Agostino | 379/436 |
| 5,069,407 | 12/1991 | Williams | 379/454 |
| 5,184,971 | 2/1993 | Williams | 379/88 |
| 5,276,588 | 1/1994 | Repplingers et al. | 455/347 |
| 5,583,935 | 12/1996 | Dunchock | 379/454 |

*Primary Examiner*—Jack Chiang
*Attorney, Agent, or Firm*—Stetina Brunda Garred & Brucker

[57] ABSTRACT

The digital recorder reversible mount for a telephone encompasses an apparatus which enables the mounting of a portable cellular phone in a manner which provides safety and utility to the user, and provides the user with optional digital sound recording capability, especially for voice recording and messaging. The bracket system is attached to a vehicle dash or console, by any acceptable means, and includes an integrated support for both a cellular telephone and an electronic recorder. The support has a first side and a second side parallel to said first side and defining an aperture extending into said support parallel to said first and second sides where it will be preferably supported by a hinge. The support will include a strike plate affixed to said first side of said bracket support, and the second side will typically be a smooth area. Inside the support, an electronic recorder is contained and manipulable by the user through buttons which enable the recording and playback of audio messages.

22 Claims, 3 Drawing Sheets

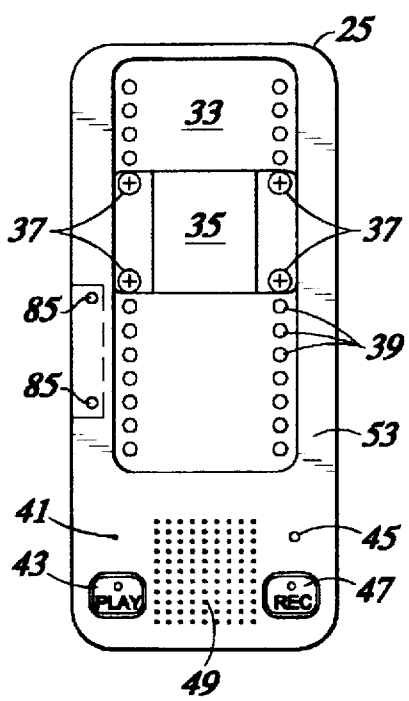
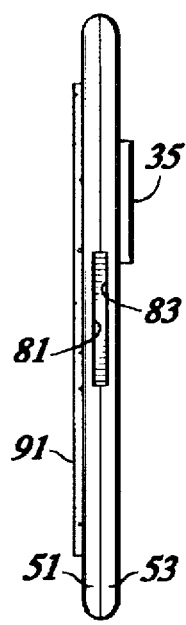
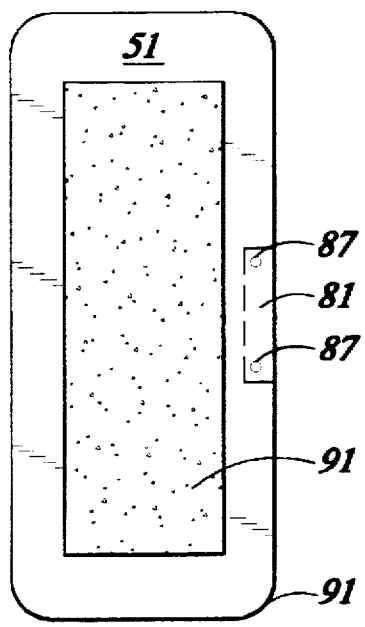
Fig. 3　　Fig. 4　Fig. 5
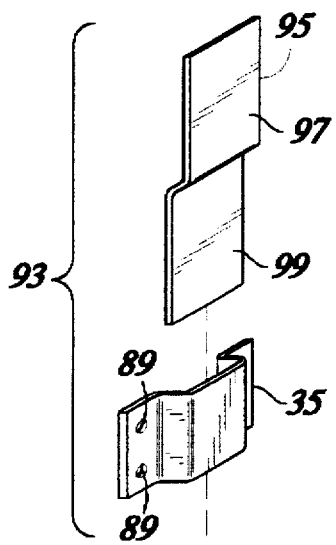
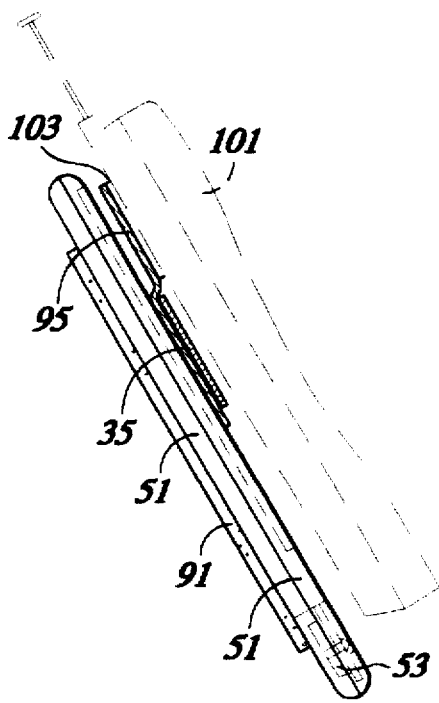
Fig. 6　　Fig. 7

DIGITAL RECORDER REVERSIBLE MOUNT FOR A TELEPHONE

This is a continuation-in-part of U.S. Pat. application Ser. No. 08/516,099 filed on Aug. 17, 1995, now Pat. No. 5,583,935.

FIELD OF THE INVENTION

The present invention relates to the field of support structures used to mount equipment, and, more specifically, to a reversible structure especially adapted for use inside a vehicle which both provides support for a mobile telephone, and also provides a digital sound and voice memo capability for the convenience of the user.

BACKGROUND OF THE INVENTION

With the continuing introduction of user convenient electronics devices, the improvements on the vehicular mobile office continue. For example, in U.S. Patent Application Ser. No. 08/359,398 now U.S. Pat. No. 5,529,271, a reversible mount for a telephone was disclosed. The reversible mount enabled the mounting of a portable cellular phone with the use of either a bracket telephone-mount interface or with the use of a hook and loop fastener interface between the telephone and mount. The bracket system was attached to a vehicle dash or console, by any acceptable means. The manner of attachment involved either a pivoting hinge or an attachment bracket having a fixed angle.

The first surface of the bracket support included a strike plate in order to withstand the wear associated with the mounting of the male member of the bracket attached to the telephone. The second surface of the mount optionally included one of either hook or loop material, preferably of loop members, which engaged a complementary surface of hook members which may be attached to a portable cellular phone.

It is advantageous to have the ability to record messages in the passenger compartment of a vehicle, particularly when a telephone is present. Not only may the user record ideas, thoughts, and notions when they occur, but the user can record and summarize the content of telephone conversations. However, the presence of independent recording equipment, which may loosely be carried in the passenger compartment can cause a hazard both because it may undergo movement during driving and may cause the driver to have to hunt for it when it is needed. Either distraction to the driver can be a source of danger and inconvenience.

What is therefore needed is a recording device which includes the ability to independently record messages and memos. Such a device will ideally be positionally fixed within the driver compartment and positioned so that the driver can have easy access. Even more ideally, the recording device should be located in the proximity of the cellular phone so that it can readily be used to record any details of the conversation which are critical. This is especially useful where the cell phone has a speaker which can produce audible sound sufficient to reach a closely mounted microphone associated with the recording device. The recording device should operate independently of the cellular telephone to give independent value to the vehicle operator during the times when the cellular telephone is not present.

SUMMARY OF THE INVENTION

The Digital Recorder Reversible Mount for a Telephone bracket mounting system of the present invention encompasses an apparatus which enables the mounting of a portable cellular phone in a manner which provides safety and utility to the user, and provides the user with optional digital sound recording capability, especially for voice recording and messaging. The bracket system is attached to a vehicle dash or console, by any acceptable means.

Physically, the integrated support for both a cellular telephone and an electronic recorder includes a support having a first side and a second side parallel to said first side and defining an aperture extending into said support parallel to said first and second sides where it will be preferably supported by a hinge. The support will include a strike plate affixed to said first side of said bracket support, and the second side will typically be a smooth area which facilitates grasping and manipulation of the lower area of the support.

The strike plate supports a female bracket for holding a cellular phone. Inside the support, an electronic recorder is contained and manipulable by the user through buttons which enable the recording and playback of audio messages.

BRIEF DESCRIPTION OF THE DRAWINGS

The invention, its configuration, construction, and operation will be best further described in the following detailed description, taken in conjunction with the accompanying drawings in which:

FIG. 3 is a plan view of the mount of FIGS. 1 and 2 and illustrating the female bracket in a pre-selected position on the face of the mount and over said digital recording device;

FIG. 4 is a side view of the mount of FIGS. 1-3 and illustrating the flush mounting of the control buttons of the digital recording device;

FIG. 5 is a rear plan view of the mount shown in FIGS. 1-4 and illustrating a smooth surface area;

FIG. 6 is a closeup view of the cooperation between a female bracket and male bracket which occurs with respect to the mounting of FIGS. 1-5; and FIG. 7 is a side view of the bracket system shown in FIGS. 1-6 and illustrating a cellular phone (in phantom) supported in place on the mount, and illustrating the position of the digital sound recorder.

DETAILED DESCRIPTION OF THE PREFERRED EMBODIMENT

Figure 1:
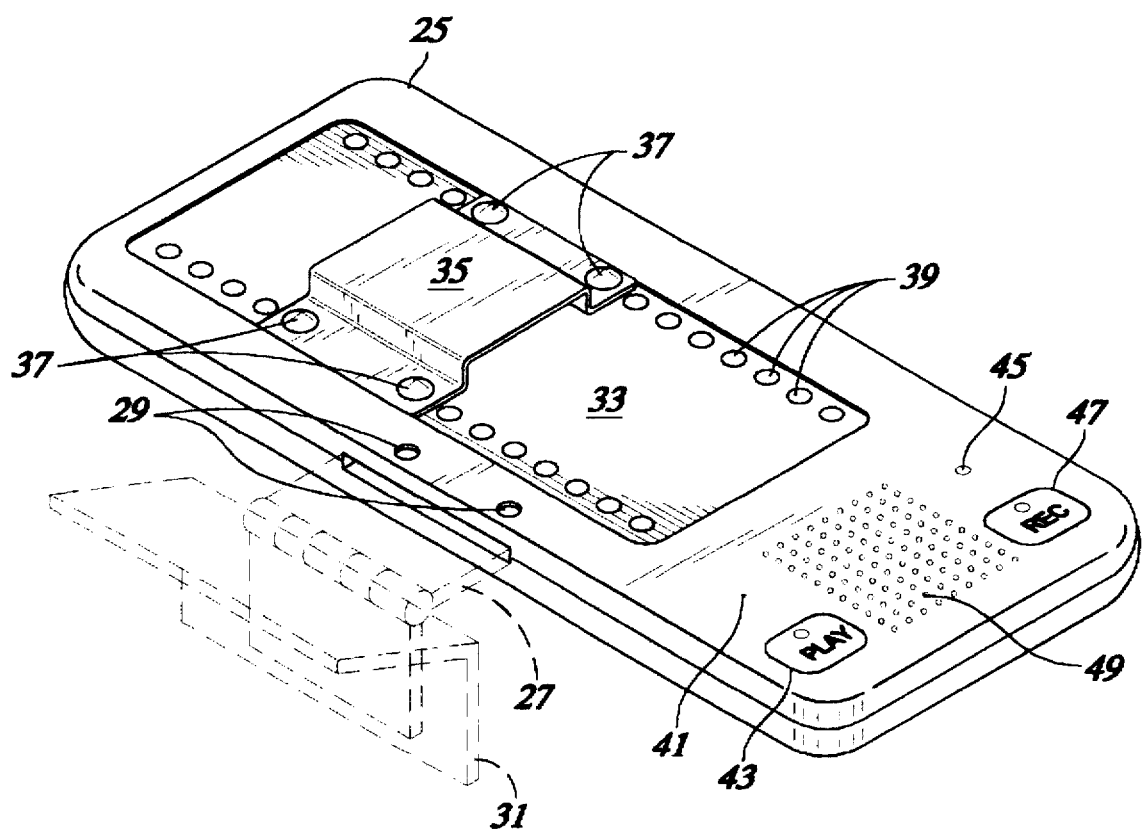
FIG. 1 is a perspective view of the mount of the present invention attached to a bracket (shown in phantom)

The description and operation of the invention will be best described with reference to FIG. 1. FIG. 1 shows a bracket support 25 which is hereafter referred to as support 25. At about the midpoint of the support 25 a hinge 27 is shown in phantom and which is inserted partially into the support 25. The hinge 25 has a pair of apertures 29 which are used to secure the support 25 to the hinge 27. The hinge 27 is shown associated with an angled member 31 which may be any surface to which the hinge 27 is attached. The attachment surface is shown as an angled member 31 in order to show the range of movement which may be expected of hinge 27 and the support 25. As can be seen in FIG. 1, the support 25 may be widely angularly displaced.

The central region of support 25 has a strike plate 33. The strike plate 33 supports a female bracket 35. A set of four screws 37 are used to join the female bracket 35 to the strike plate 33 by engagement with the material within the support 25.

As can be seen, a variety of apertures 39 are available in the strike plate 33 to accommodate the screws 37 to enable the female bracket 35 to be mounted at discrete heights along the surface of the strike plate 33. The spacing of the apertures 39 is such that the apertures 39 will align with matching apertures in the female bracket 35 which together will enable attachment of the female bracket 35 to the bracket support 25.

Near the lower surface of the support 25, a number of features are seen. At the lower left side of the support 25 microphone aperture 41 is located above a play button 43. At the lower right side of the support 25, a record indicator light aperture 45 is located above a record button 47. Centrally located with respect to the microphone aperture 41, play button 43, record indicator light aperture 45, and record button 47, is a speaker grille 49 which is shown as a row and column array of small apertures formed to enable an internally mounted speaker to produce adequate sound exterior to the support 25.

Figure 2:
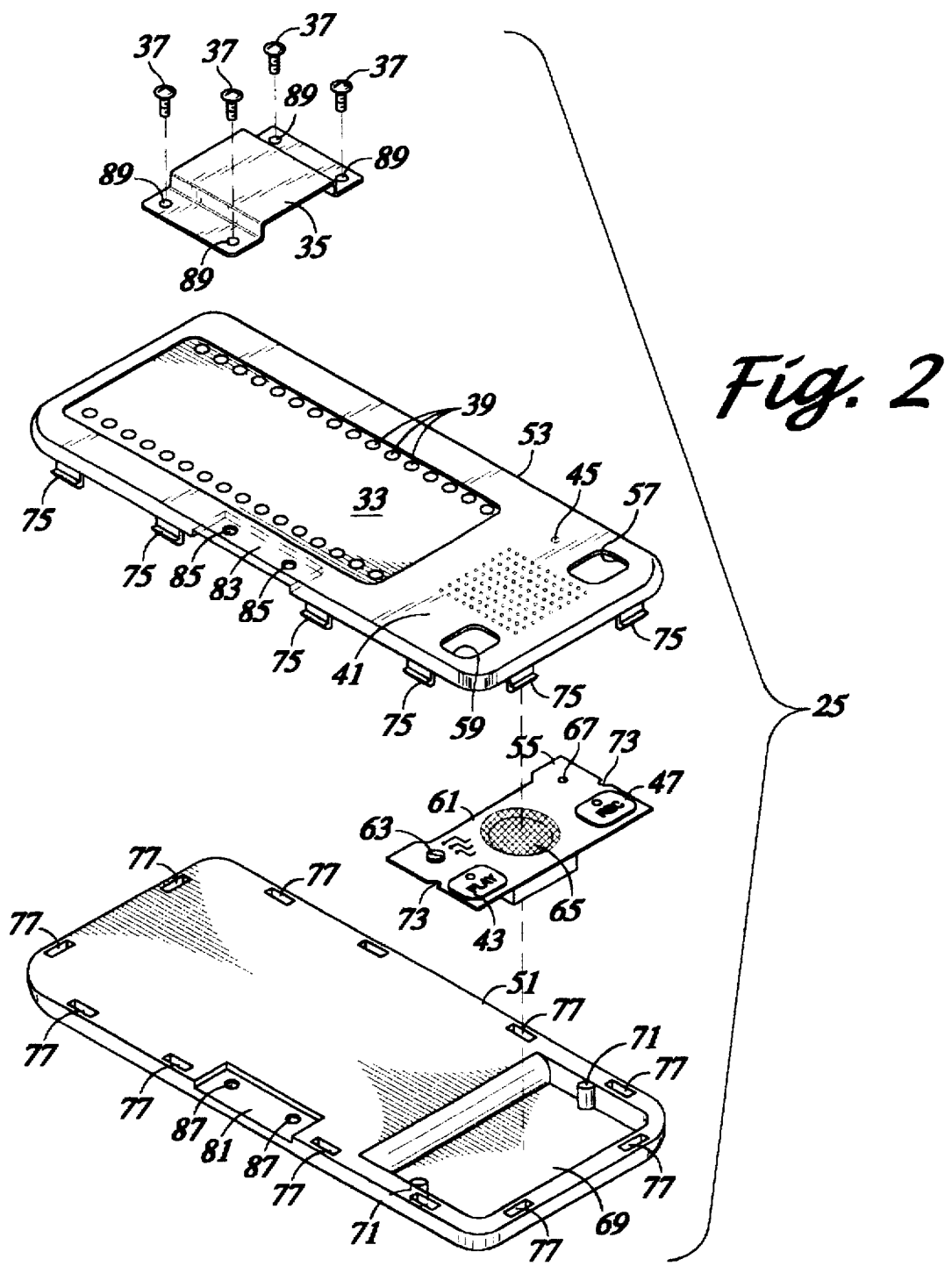
FIG. 2 is an exploded view of the mount shown in FIG. 1 and illustrating the construction thereof.

Referring to FIG. 2, an exploded view of the support 25 of FIG. 1 illustrates a base housing portion 51, an upper housing portion 53, and a compact digital electronic recording unit 55 which will be sandwiched between the upper housing portion 53 and the base housing portion 51. The electronic recording unit 55 supports the record button 47 and the play button 43. As can be seen on the upper housing portion 53, the record button 47 will extend partially into a record button aperture 57, while the play button 43 will extend partially into a play button aperture 59.

The electronic recording unit 55 is available in the form of a circuit board 61 mounted device supporting, in addition to the play and record buttons 43 and 47, a microphone 63, speaker 65, and a record light 67. The electronic recording unit 55 will preferably be self powered and will preferably have changeable batteries.

In the base housing portion 51, a recording unit accommodation space 69 has a pair of alignment structures 71 which not only assist the upper housing portion 53 to interfit with the base housing portion 51, but also stabilize and fix the electronic recording unit 55 within the accommodation space 69. The exterior of the alignment structures 71 (as well as structures carried by the upper housing portion 53 which mate with the alignment structures 71) will fit partially into oppositely disposed opposing cut-outs 73 on the circuit board 61. Preferably, the electronic recording unit 55 can be first mounted into either one of the upper or base housing portions 53 or 51 to achieve an assembled support 25.

Note also that the upper housing portion 53 has a series of downwardly and outwardly directed locking tabs 75 which are dispersed about the periphery of the upper housing portion 53. The downwardly and outwardly directed locking tabs align with a mating set of locking slots 77 dispersed about points near the periphery of the base housing portion 51. These locking tabs 75 and locking slots 77 can be of such design to completely hold the upper housing portion 53 completely locked onto the base housing portion 51, without the need for further joining structures.

Also seen is a lower hinge groove 81 formed with respect to the base housing portion 51, and an upper hinge groove 83 formed with respect to the upper housing portion 53, for joining. The upper hinge groove 81 is formed behind a pair of upper housing groove apertures 85 which align with the apertures 29 of the hinge 25. The base housing portion 51 has a pair of bores 87 which will accommodate screws used to join the hinge 27 to the mount 25. The apertures 85 and 87 may be formed to engage screws used to join the mount 25 to the hinge 27. The details of attachment will depend upon the materials used and the specific details of the hardware involved.

Also can be seen apertures 89 in the female bracket 35, through which the screws 37 extend to secure the female bracket 35 to the strike plate 33. The strike plate 33 may be adhesively attached to the face of the upper housing portion 53. Alternatively, the strike plate 33 may be present while the upper housing portion 53 is formed, as by injection molding. In this event, the strike plate 33 will be somewhat surrounded by the material of the upper housing portion 53, to "lock" the strike plate into place.

Referring to FIG. 3, a plan view of the front of the support 25 illustrates many of the structures previously shown in FIGS. 1 and 2. This is the most detailed view and more closely associated with the view which a user will have during use of the compact digital electronic recording unit 55. The user can simply press the record button 47, perhaps holding it down, and speaking in the direction of the mount 25. A recording of the user's voice will be made inside the compact digital electronic recording unit 55 and held for playback. During recording, the recording light 67 is typically seen through the record indicator light aperture 45 to indicate that the unit is recording.

After recording, the play button 43 may be depressed to play back the recorded message through the speaker 65. The unit illustrated is simple in operation, and it is understood that other capabilities can be utilized, including multiple message memory selection both by individual key as well as by a sequential selection of the messages to be played back.

Referring to FIG. 4, a side view of support 25 illustrates the bilateral symmetry of the support 25. The line which demarks the base housing portion 51 from the upper housing portion 53 is readily seen. The alignment of the lower hinge groove 81 and the upper hinge groove 83 is seen. The resulting slot will accommodate the hinge 27 which was shown in FIG. 1.

Referring to FIG. 5, a rear view of the support 25 is shown. The lower hinge groove 81 is shown in phantom.

Referring to FIG. 6, a male and female bracket set 55 includes the female bracket 35 shown in FIGS. 1–5, but also shows one configuration of a male bracket 95. Although any number of different types of male brackets could interfit with the female bracket 35, the male bracket 95 is shown is comprised of an upper planar portion 97 which is offset but parallel to a lower planar portion 99. The male bracket 95 is preferably made from a single piece of material which is sharply angled about its midpoint. In the configuration shown, the upper planar portion 97 would be affixed to a portable cellular phone while the lower planar portion 99 would be fittable into the female bracket 35 in a manner shown by the dashed line.

Note that the male bracket 95 may be turned over its horizontal axis and that the upper planar portion 97 and the lower planar portion 99 will have switched position. Referring to FIG. 7, the completed mounting arrangement with respect to bracket support 25 is shown, including a portable cellular phone 101, which is shown in phantom. To the rear face of the cellular phone 101 a thickness of adhesive 103 attaches the body of cellular phone 101 to the upper planar portion 97 of the male bracket 95. The lower portion 99 of the male bracket 95 is secured between the strike plate 33 and the inside surface of the female bracket 35. Therefore to remove the cellular phone 101, the cellular phone 101 need only be grasped and moved upwardly in a direction parallel to the support 25.

The advantages of the configuration shown in FIG. 7 include ease of handling, safety, prevention of the cellular phone 101 from falling off of the bracket support, even under the most severe movement of the vehicle in which the cellular phone 101 is mounted. Further, the electronic recording unit 55 is seen located in close proximity to the cellular telephone 101 to enable the unit 55 to pick up audio from the telephone 101. Where the telephone 101 is wired for speaker phone operation, the electronic recording unit 55 will be readily available to pick up full conversations. When the user wishes, he only need press the record button 47 to record a short message, whether the cellular phone 101 is in use or not.

While the present invention has been described in terms of a bracket support with an integrated digital recorder, one skilled in the art will realize that the structure and techniques of the present invention can be applied to many appliances. The present invention may be applied in any situation where good, sturdy support is desired, along with the ability to independently provide electronic conveniences, such as the enablement of digital electronic recording and playback.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An integrated support for both a cellular telephone and an electronic recorder comprising:
   a support having a first side and a second side parallel to said first side and defining an aperture extending into said support parallel to said first and second sides;
   a strike plate affixed to said first side of said support;
   a female bracket affixed to said strike plate, said female bracket being translatable with respect to said strike plate such that the female bracket may be disposed in a variable fixed position to accommodate a particular cellular telephone;
   and an electronic recorder cartridge slidably engageable to said support.

2. The support recited in claim 1 wherein said electronic recorder has a record button and a play button, and wherein said first side of said support defines a record button aperture into which said record button extends, and a play button aperture into which said play button extends.

3. The support recited in claim 2 wherein said electronic recorder has a record light and wherein said first side of said support defines a record light aperture through which light from said record light passes.

4. The support recited in claim 1 wherein said strike plate has a plurality of apertures and said female bracket has mounting holes in alignment with said apertures and further comprising mounting screws engaging said mounting holes through said apertures and to said support.

5. The support recited in claim 1 wherein said female bracket defines a main surface in a first plane and wherein said female bracket has a pair of mounting surfaces in a second plane parallel to said first plane, and each of the mounting surfaces being oppositely disposed with respect to said main surface.

6. The support recited in claim 5 wherein said female bracket is formed from a single piece of material.

7. The support recited in claim 5 wherein said support is vertically oblong and where said female bracket forms a vertically extending open ended aperture with respect to said strike plate.

8. The support recited in claim 1 wherein said support further comprises:
   a base housing portion defining an accommodation space for containing said electronic recorder, and having a plurality of locking structures; and
   an upper housing portion fittable with said base housing portion and having a plurality of locking structures interlockable with said locking structures of said base housing portion.

9. The support recited in claim 8 wherein said plurality of locking structures of said base housing portion are locking slots and wherein said plurality of locking structures of said upper housing portion fittable with said locking slots are locking tabs.

10. The support of claimed further comprising a cellular telephone support and electronic recorder kit including a male bracket interfitting with said female bracket and attachable to a cellular telephone.

11. The kit of claim 10 further comprising a hinge interfittable with the aperture of said support.

12. The kit of claim 11 wherein said support pivots on the hinge along a planar moment of angular displacement about a line parallel to a sides of said support.

13. The kit of claim 10 wherein said male bracket has a first planar surface and a second planar surface parallel to and set apart from said first planar surface.

14. An integrated support for both a cellular telephone and an electronic recorder comprising:
   a support having a first side and a second side parallel to said first side and defining an aperture extending into said support parallel to said first and second sides;
   a strike plate affixed to said first side of said support;
   a female bracket affixed to said strike plate, said female bracket having a main surface in a first plane, said female bracket further having a pair of mounting surfaces in a second plane parallel to said first plane, and each of the mounting surfaces being oppositely disposed with respect to said main surface; and
   an electronic recorder cartridge slidably engageable to said support.

15. The support recited in claim 14 wherein said electronic recorder cartridge has a record button and a play button, and wherein said first side of said support defines a record button aperture into which said record button extends, and a play button aperture into which said play button extends.

16. The support recited in claim 15 wherein said electronic recorder cartridge has a record light and wherein said first side of said support defines a record light aperture through which light from said record light passes.

17. The support recited in claim 14 wherein said strike plate has a plurality of apertures and said female bracket has mounting holes in alignment with said apertures and further comprising mounting screws engaging said mounting holes through said apertures and to said support.

18. The support recited in claim 14 wherein said female bracket is formed from a single piece of material.

19. The support recited in claim 14 wherein said bracket is vertically oblong and where said female bracket forms a vertically extending open ended aperture with respect to said strike plate.

20. The support recited in claim 14 wherein said support further comprises:

- a base housing portion defining an accommodation space for containing said electronic recorder cartridge, and having a plurality of locking structures; and
- an upper housing portion fittable with said base housing portion and having a plurality of locking structures interlockable with said locking structures of said base housing portion.

21. The support recited in claim 20 wherein said plurality of locking structures of said base housing portion are locking slots and wherein said plurality of locking structures of said upper housing portion fittable with said locking slots are locking tabs.

22. The support recited in claim 14 wherein the female bracket is translatable along the surface of the strike plate.

* * * * *